(12) United States Patent
Consiglio et al.

(10) Patent No.: US 10,794,387 B2
(45) Date of Patent: Oct. 6, 2020

(54) DAMPING CHARACTERISTIC DETERMINATION FOR TURBOMACHINE AIRFOILS

(71) Applicant: United Technologies Corporation, Farmington, CT (US)

(72) Inventors: Andrew Consiglio, Southbury, CT (US); Daniel L. Gysling, South Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 292 days.

(21) Appl. No.: 15/256,426

(22) Filed: Sep. 2, 2016

(65) Prior Publication Data
US 2018/0066668 A1 Mar. 8, 2018

(51) Int. Cl.
*F04D 27/00* (2006.01)
*F01D 21/14* (2006.01)
(Continued)

(52) U.S. Cl.
CPC .......... *F04D 27/001* (2013.01); *F01D 17/04* (2013.01); *F01D 21/003* (2013.01); *F01D 21/14* (2013.01); *F04D 29/325* (2013.01); *G01H 1/006* (2013.01); *G01M 15/14* (2013.01); *F05D 2220/36* (2013.01); *F05D 2270/334* (2013.01); *F05D 2270/808* (2013.01)

(58) Field of Classification Search
CPC .... F04D 27/001; F04D 29/325; F04D 27/002; F04D 25/166; G01M 15/14; F16K 3/08; B05B 12/06; B05B 1/083–086; B05B 3/02–12

USPC ............................................. 73/112.01, 147
See application file for complete search history.

(56) References Cited

U.S. PATENT DOCUMENTS 3,273,592 A * 9/1966 Deubler .................... F16K 3/08
137/624.13
3,555,892 A * 1/1971 Hizume .................. G01M 7/00
73/671
(Continued)

FOREIGN PATENT DOCUMENTS

DE 102006048791 A1 * 4/2008 ......... G01N 29/4418
FR 2956206 A1 * 8/2011 ........... G01N 29/045
(Continued)

OTHER PUBLICATIONS

Dr. John S. Denker, The Meaning of "Vapor", "Gas", and "Fluid", (Year: 2006).*
(Continued)

*Primary Examiner* — David L Singer
(74) *Attorney, Agent, or Firm* — Carlson, Gaskey & Olds, P.C.

(57) ABSTRACT

An aeromechanical identification system for turbomachine includes at least one actuator mounted on a stationary structure to excite rotatable airfoils. At least one sensor is mounted proximate the airfoils for measuring a response of the airfoils responsive to excitation from the at least one actuator. A controller is configured to determine a damping characteristic of an aeromechanical mode of the rotating airfoils based on the excitation and the response. A gas turbine engine and a method of determining a flutter boundary for an airfoil of a turbomachine are also disclosed.

16 Claims, 4 Drawing Sheets

(51) Int. Cl.
*F01D 17/04* (2006.01)
*F01D 21/00* (2006.01)
*G01H 1/00* (2006.01)
*F04D 29/32* (2006.01)
*G01M 15/14* (2006.01)

(56) References Cited

U.S. PATENT DOCUMENTS

| | | | |
|---|---|---|---|
| 3,651,688 A * | 3/1972 | Hizume | G01M 7/00 |
| | | | 73/671 |
| 4,073,600 A | 2/1978 | Doman | |
| 4,475,385 A | 10/1984 | Farmer | |
| 4,776,216 A * | 10/1988 | Barton | G01H 1/006 |
| | | | 73/660 |
| 5,005,353 A * | 4/1991 | Acton | F01D 17/02 |
| | | | 60/39.281 |
| 5,206,816 A | 4/1993 | Hill et al. | |
| 6,195,982 B1 * | 3/2001 | Gysling | F04D 29/668 |
| | | | 415/119 |
| 6,339,878 B1 | 1/2002 | Owen et al. | |
| 6,582,183 B2 | 6/2003 | Eveker et al. | |
| 6,584,849 B2 | 7/2003 | Loftus et al. | |
| 7,383,136 B1 | 6/2008 | Griffin et al. | |
| 7,509,862 B2 | 3/2009 | Cohen et al. | |
| 8,646,251 B2 | 2/2014 | Rosenkrans et al. | |
| 2002/0059831 A1 * | 5/2002 | Naudet | G01N 29/045 |
| | | | 73/579 |
| 2002/0083772 A1 * | 7/2002 | Sonnichsen | G01H 1/006 |
| | | | 73/660 |
| 2006/0056959 A1 | 3/2006 | Sabol et al. | |
| 2011/0081229 A1 | 4/2011 | Kottilingam et al. | |
| 2013/0298686 A1 * | 11/2013 | Royer et al. | G01H 1/006 |
| | | | 73/660 |
| 2014/0208837 A1 * | 7/2014 | Agoos et al. | G01M 15/14 |
| | | | 73/112.01 |
| 2016/0123175 A1 | 5/2016 | Mazzaro | |
| 2016/0123238 A1 | 5/2016 | Kay et al. | |
| 2016/0258440 A1 * | 9/2016 | Henry | F04D 27/001 |
| 2017/0175566 A1 * | 6/2017 | Burnside et al. | F01D 5/02 |
| 2017/0292450 A1 * | 10/2017 | Kutnjak et al. | F02C 1/06 |

FOREIGN PATENT DOCUMENTS

| | | |
|---|---|---|
| WO | 2015073852 A1 | 5/2015 |
| WO | 2015178974 A2 | 11/2015 |

OTHER PUBLICATIONS

Banaszuk et al., "Active Control of Flutter in Turbomachinery Using Off Blade Actuators Sensors. Part II: Control Algorithm" Proceedings of the 41st IEEE, Conference on Decision and Control, Las Vegas, Nevada USA, December, pp. 3704-3709, Dec. 2002.

Rey et al., "Active Control of Flutter in Turobmachinery Using Off Blade Actuators Sensors: Experimental Results" 41st Aerospace Sciences Meeting and Exhibit, Reno, Nevada, Jan. 6-9, 2003, pp. 1-6.

Banaszuk et al., "Active Control of Flutter in Turbomachinery Using Off Blade Actuators and Sensors. Part I: Modeling for Control", IFAC, 2002, pp. 1-6.

European Search Report for European Application No. 17189255.7 dated Dec. 12, 2017, pages total: 8.

\* cited by examiner

DAMPING CHARACTERISTIC DETERMINATION FOR TURBOMACHINE AIRFOILS

BACKGROUND

A gas turbine engine is an example of a turbomachine and typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Flutter is a mechanical instability of turbomachine airfoils that occurs when an airfoil becomes self-excited. Flutter is commonly defined as a self-excited aero-elastic instability that can lead to destructive levels of vibration. Flutter is not typically encountered during engine operation because turbine engine manufacturers test to determine where flutter occurs within the operating space of a gas turbine to determine a flutter boundary and set operational limits and maintenance protocols to prevent such an occurrence. The operational limits and maintenance protocols defined in view of engine testing include large safety margins relative to the determined flutter boundary. The large margins account for known and unknown engine operating parameters that can contribute to the occurrence of flutter. Accordingly, current means of identifying a flutter boundary provides limited quantifiable information on the aeromechanical stability of a turbomachine component.

Turbomachine manufacturers continue to seek further improvements to engine operation including improvements to propulsive and economic efficiencies.

SUMMARY

In a featured embodiment, an aeromechanical identification system for turbomachine includes at least one actuator mounted on a stationary structure to excite rotatable airfoils. At least one sensor is mounted proximate the airfoils for measuring a response of the airfoils responsive to excitation from the at least one actuator. A controller is configured to determine a damping characteristic of an aeromechanical mode of the rotating airfoils based on the excitation and the response.

In another embodiment according to the previous embodiment, wherein the at least one actuator includes at plurality of actuators spaced circumferentially apart around the casing of the turbomachine.

In another embodiment according to any of the previous embodiments, the at least one actuator includes an injector that directs a jet stream at the rotating airfoil.

In another embodiment according to any of the previous embodiments, the injector includes an inlet receiving gas flow, a varying orifice and an injector opening disposed proximate to the rotating airfoil.

In another embodiment according to any of the previous embodiments, the at least one actuator includes a modulating control valve that modulates the jet stream to excite the airfoils.

In another embodiment according to any of the previous embodiments, the jet stream is one of a directed gas jet, a directed fluid jet and a directed jet of a combination of gas and fluid.

In another embodiment according to any of the previous embodiments, the varying orifice includes a rotating plate with at least one openings. The rotating plate is moveable to communicate the at least one openings with the inlet at periodic intervals determined to generate the defined frequency of the jet stream gas to excite the rotating airfoils.

In another embodiment according to any of the previous embodiments, the injector opening is disposed at an end portion of an outlet tube that extends into an airstream proximate the airfoils.

In another embodiment according to any of the previous embodiments, the actuator directs the jet stream toward a leading edge portion of a tip of the rotating airfoil.

In another embodiment according to any of the previous embodiments, the actuator directs the jet stream against a tip of the airfoil from a position radially outward of the airfoil.

In another embodiment according to any of the previous embodiments, the sensor includes a non-contact measurement device supported radially outward of a tip of the rotating airfoil.

In another embodiment according to any of the previous embodiments, the sensor includes a beam interrupt measurement system including a first probe disposed upstream of the rotating airfoil and a second probe downstream of the rotating airfoil. The beam interrupt measurement system is configured to determine airfoil characteristics responsive to interruption of a beam projected between the first probe and the second probe.

In another embodiment according to any of the previous embodiments, the sensor and actuator are mounted at a common location proximate the rotating airfoil.

In another embodiment according to any of the previous embodiments, includes a strain gauge attached to the airfoil configured to communicate information indicative of strain on the airfoil responsive to the energy stream to the controller.

In another featured embodiment, a gas turbine engine includes a rotating row of airfoils circumscribed by a fixed case. At least one injector is mounted within the case and configured for directing an energy stream over a range of frequencies to excite the row of rotating airfoils. At least one sensor is mounted within the case configured for measuring a structural response of the rotating row of airfoils to the directed energy stream. A controller is configured to determine a damping characteristic of an aeromechanical mode of the rotating row of airfoils based the response of the energy stream excitation.

In another embodiment according to the previous embodiment, the at least one injector includes a plurality of injectors spaced circumferentially apart within the fixed case.

In another embodiment according to any of the previous embodiments, the at least one injector includes a varying orifice moveable to communicate a plurality of openings with an inlet at intervals determined to generate the defined frequency of air injection proximate the row of airfoils.

In another embodiment according to any of the previous embodiments, the at least one sensor includes a non-contact measurement device supported radially outward of a tip of the row of rotating airfoils.

In another embodiment according to any of the previous embodiments, the at least one sensor includes a beam interrupt measurement system including a first probe disposed upstream of the rotating airfoils and a second probe downstream of the rotating airfoils. The beam interrupt measurement system is configured to determine airfoil characteristics responsive to interruption of a beam projected between the first probe and the second probe.

In another embodiment according to any of the previous embodiments, includes a strain gauge attached to at least one of the row of rotating airfoils, the strain gauge configured to communicate information indicative of stresses on the airfoil responsive to the energy gas stream to the controller.

In another featured embodiment, a method of determining a flutter boundary for an airfoil of a turbomachine includes directing an energy stream with an actuator over a defined frequency range to excite a row of rotating airfoils. A structural response of the row of airfoils responsive to the directed energy stream is detected with a sensor mounted proximate the airfoils. An aeromechanical damping characteristic of the row of airfoils in a stable turbomachine operating range is determined based structural response of the row of airfoils. A value of a set of turbomachine operating parameters intended to ensure the safe operation of the turbomachine with respect to a flutter boundary for the turbomachine operating parameter based on the determined aeromechanical damping characteristics of the row of airfoils is defined within the stable turbomachine operating range.

In another embodiment according to the previous embodiment, the turbomachine operating parameter includes at least one of a rotor speed, back pressure on the airfoil, flow rate through the airfoil row, altitude and corrected fan speed.

In another embodiment according to any of the previous embodiments, the actuator includes a gas injector directing a stream of air at the rotating airfoil.

In another embodiment according to any of the previous embodiments, the sensor includes a non-contact sensor mounted proximate a tip of the airfoil.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
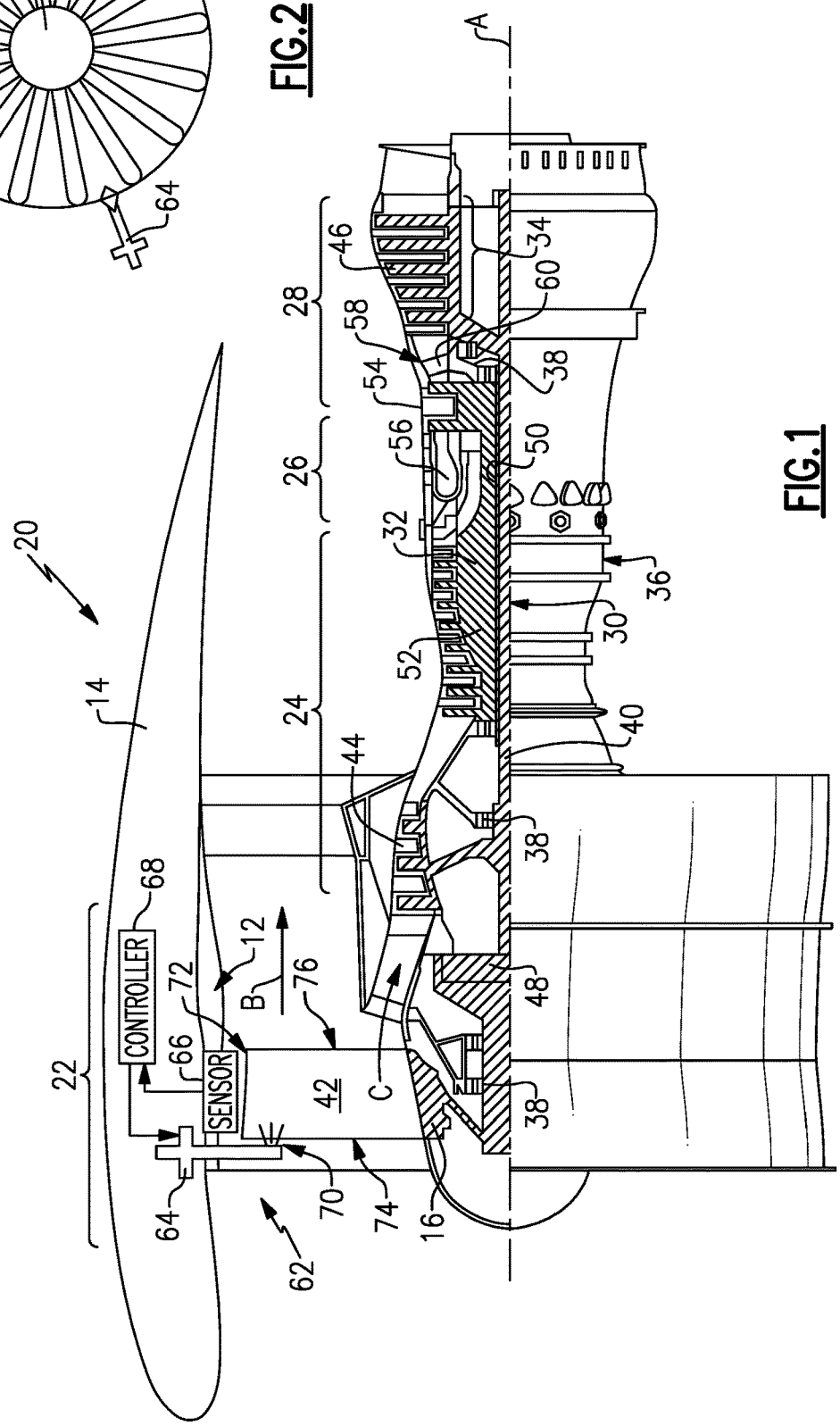
FIG. 1 is a schematic view of an example gas turbine engine.

FIG. 1 schematically illustrates a turbomachine disclosed by way of example in this disclosure as gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within an outer nacelle 14, while the compressor section 24 drives air along a core flow path C for compression and communication into the combustor section 26 then expansion through the turbine section 28.

Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures. Moreover, other forms of turbomachines are also within the contemplation if this disclosure.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 58 of the engine static structure 36 is arranged generally between the high pressure turbine 54 and the low pressure turbine 46. The mid-turbine frame 58 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 58 includes airfoils 60 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the disclosed system is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10.67 km). The flight condition of 0.8 Mach and 35,000 ft (10.67 km), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. The TSFC is a measure of the amount of fuel consumed to generate a specified amount of thrust for a specified period. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°R)]^{0.5}$. The "Low corrected fan tip speed" as disclosed herein according to one non-limiting embodiment is less than about 1150 ft/second (350 m/second).

The example gas turbine engine includes the fan section 22 that comprises in one non-limiting embodiment less than about twenty-six (26) fan blades 42. In another non-limiting embodiment, the fan section 22 includes less than about twenty (20) fan blades 42. A fan case 12 circumscribes the fan blades 42 and is disposed within the outer nacelle 14.

In one disclosed embodiment the low pressure turbine 46 includes no more than about six (6) turbine rotors schematically indicated at 34. In another non-limiting example embodiment the low pressure turbine 46 includes about three (3) turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

It should be understood that although the disclosed system is explained by way of the example gas turbine engine 20, that the features and methods disclosed herein are applicable to all turbomachines that include any type of rotating airfoils. Moreover, although the disclosed example embodiment is explained with regard to fan blades, other airfoils in other portions of a turbomachine may also benefit from this disclosure and are within the contemplation of this disclosure.

Flutter is a phenomenon encountered in flexible structures such as airfoils subjected to aerodynamic forces, specifically, flutter is associated with the motion dependent forces when an airfoil moves within a flow field, the motion of the airfoil modifies the aerodynamic forces on the airfoil. Typically, these motion dependent forces work to extract energy from any airfoil vibration, thus causing any vibration to damp out with time. The level to which motion dependent aerodynamic forces damping out airfoil vibration can be viewed as aerodynamic damping. The net influence of motion dependent aerodynamic forces over one vibratory cycle is characterized by an aerodynamic damping ratio, formulated in a manner similar to that used to characterize mechanical damping ratios of vibratory systems. The aerodynamic damping ratio is added to any additional mechanical damping ratio present in the airfoil to determine the net aeromechanical damping ratio. As long as the net aeromechanical damping ratio is positive, airfoil vibration is damped out with time and the airfoil is said to be stable. However, if the motion dependent aerodynamic forces add energy to vibrations, the aerodynamic damping is said to be negative. If the aerodynamic damping ratio is more negative than the always positive mechanical damping ratio, small vibrations grow with time and the airfoil is said to be unstable and flutter results. The amplitude of the vibrations associated with an airfoil encountering a flutter boundary can be large and destructive to the airfoil and thus need to be avoided.

Turbomachinery manufacturers perform tests to define safe operating regions for the structures of a gas turbine engine. For example, rotor 16 supporting the fan blade 42 maybe operated at increased speeds while monitoring vibration characteristics with sensors mounted to the fan blades 42. Engine rotational speed is only one parameter of many possible operating parameters that influence aeromechanical stability and is discussed by way of a non-limiting example in this disclosure. Once self-excited vibrations of a sufficient level are encountered, the rotor 16 and fan blades 42 are returned to a stable operating range and the operating point at which the self-exited vibrations developed is denoted as the flutter boundary. Engine operation is then constrained based on the set of engine operating parameters determined to result in flutter. Additionally, a margin is defined such that the engine is not operated near the speeds associated with the flutter boundary to account for other engine parameters that could cause flutter to occur prior to the determined flutter boundary.

For an airfoil to be stable, the airfoil must have net positive aeromechanical damping. Degradation of the aeromechanical damping can thus be viewed as a precursor to the onset of flutter. Any reduction in the airfoils aeromechanical damping capability indicates that the airfoil is operating closer to a flutter boundary. In other words, any change in the airfoil, or the system in which it is operating, or the operating conditions that moves the airfoil closer to it flutter boundary is preceded by a decrease in aeromechanical damping capability. From this perspective, the aeromechanical damping of key aeromechanical modes provides a measure of stability and that maintaining sufficient aeromechanical damping is a useful method to help ensure flutter free operation. A decrease in the aeromechanical damping or any decreases that occur faster than an expected rate are an indicator that corrective action may be necessary to prevent flutter.

An aeromechanical identification system 62 is schematically shown installed within the engine 20. The disclosed example system 62 includes at least one actuator 64 mounted on the fan case 12 proximate the fan blades 42. The actuator 64 directs an energy stream with energy within a defined frequency range to excite the fan blades 42 over said defined frequency range. At least one sensor 66 is also mounted in the fan case 12 proximate the fan blades 42 for measuring a structural response of the fan blades 42 to the directed energy from the actuator 64. A controller 68 is provided that directs the actuator 64 and receives information from the sensor 66 indicative of a response from the fan blades 42. The actuator 64 excites the fan blades of the rotor over a range of frequencies that spans the frequency of the aeromechanical mode of interest and the sensor senses a response of the fan blades of the rotor over said range of frequencies.

The controller 68 is configured to determine a damping characteristic of an aeromechanical mode of the fan blade 42 based on the input directed energy and the structural response detected by the sensor 66. The disclosed system measures the mechanical admittance of specific aeromechanical modes by selecting a range of temporal frequencies of the excitation in the stationary frame to excite specific aeromechanical modes in the rotating frame. If the excitation has sufficiently constant frequency content near and around the resonant frequency, the spectral content of the response of the aeromechanical mode near its resonant frequency is representative of the mechanical admittance of the aeromechanical mode and its damping and natural frequency can be determined by fitting the response with a model of an $n^{th}$ order oscillator. It should be understood that although the system 62 is disclosed by way of example with regard to fan blades 42, other airfoils such as those within the compressor section 24 and turbine section could also be monitored and are within the contemplation of this disclosure.

Figure 2:
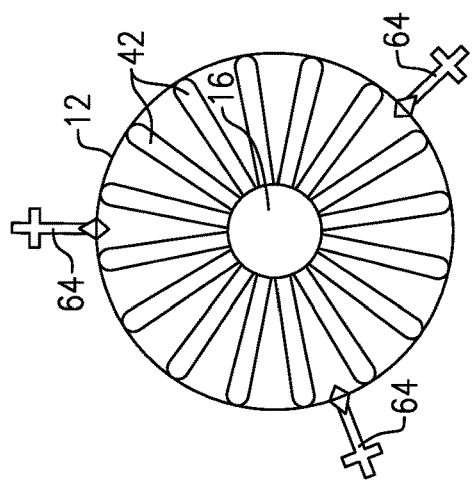
FIG. 2 is a schematic view of fan section of a turbofan engine.

Referring to FIG. 2, with continued reference to FIG. 1, a single actuator 64 could be used at a single circumferential position to excite all spatial harmonics of the fan blade 42. Moreover, a plurality of similarly configured actuators 64 could be utilized as shown in FIG. 2 to further enable different phasing of directed energy. In one example, three actuators 64 are mounted within the fan case 12 of the nacelle 14 and spaced circumferentially apart. Utilizing more than one actuator 64 and maintaining specific phasing of the actuators with respect to each other enables the system to maximize harmonic content of a specific spatial harmonic that in turn increases signal to noise ratio for a given level of excitation.

The disclosed actuators 64 inject an energy jet stream at the rotating fan blades 42. In the disclosed example, the jet stream is directed toward a leading edge 74 of the fan blade 42 near the tip 72. It is also within the contemplation of this disclosure to arrange the actuator 64 to direct the air stream 70 radially inward toward the tip 72. Additionally, the actuator 64 may be configured to direct energy toward a trailing edge 76 of the fan blades 42. In any orientation, the actuator 64 injects the jet stream 70 to impact the fan blades 42 to initiate a response measured and detected by the sensor 66. The example jet stream may include air, gas, liquid or a combination of air, gas and liquid to excite the fan blades 42.

The example sensor 66 is a non-contact sensor that detects passing of the fan blade 42 and generates an output to the controller 68 indicative of an aeromechanical response of the fan blades 42. The example sensor 66 illustrated in FIGS. 1 and 2 is blade-tip measurement system that generates information upon the passing of a tip 66 of each fan blade 42. The blade-tip-timing measurement system provides a cost-effective, high spatial resolution system for the measurement of aeromechanical responses. It should be understood that other sensor systems that measure a response of the fan blade 42 are also contemplated for use with the disclosed system 62.

Figure 3:
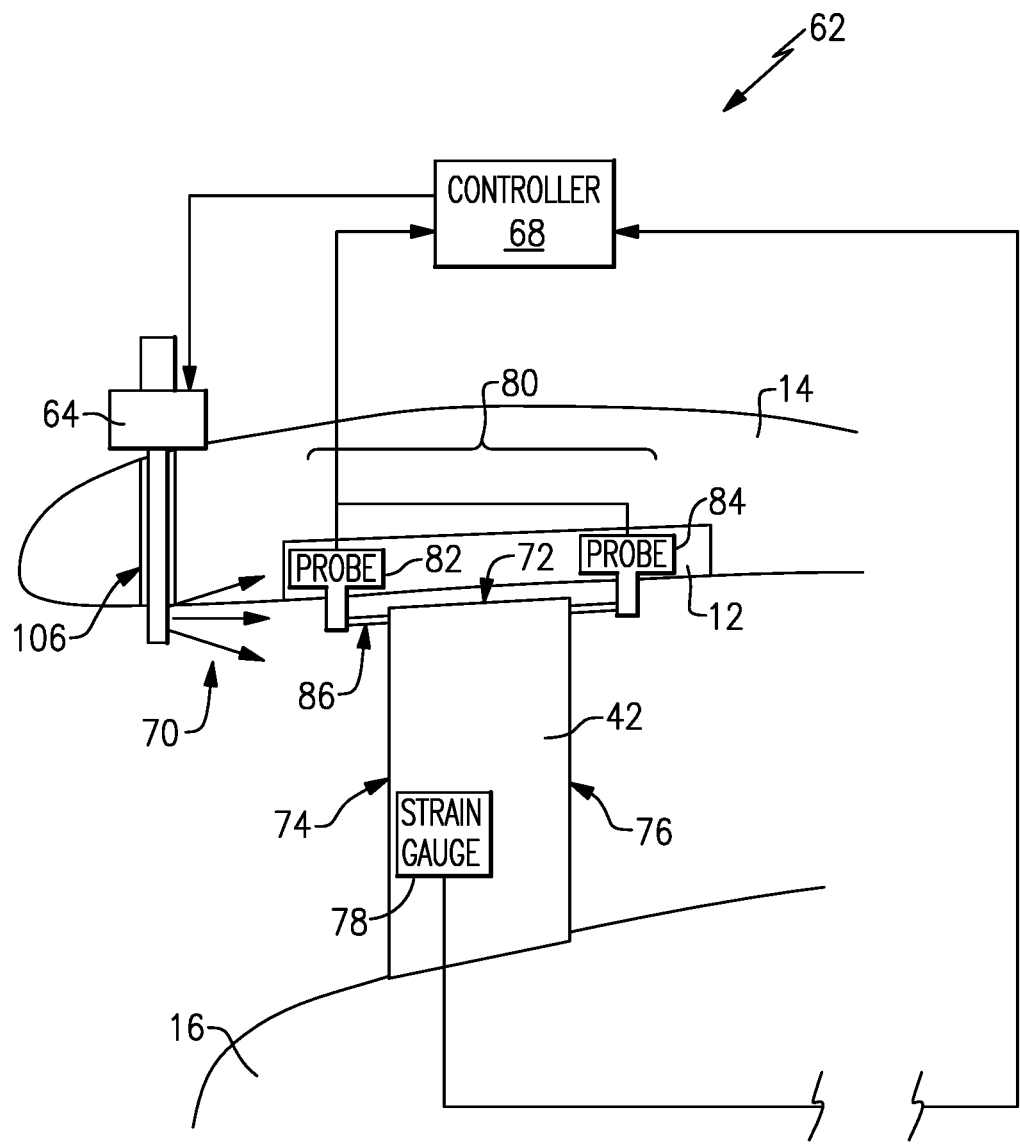
FIG. 3 is a schematic view of an example aeromechanical identification system embodiment.

Referring to FIG. 3, with continued reference to FIG. 1, the example system 62 is illustrated with a beam interrupt non-contact sensor system 80. The sensor system 80 includes a first probe 82 mounted axially forward of the fan blades 42 and a second probe 84 mounted aft of the fan blades 42. A laser signal beam 86 is directed between the probes 82, 84 and interrupted by a passing blade 42. Accordingly, the beam 86 is interrupted for the time that the blade 42 passes between the probes 82, 84. The beam 86 is initially interrupted by the leading edge 74 of the fan blade 42 and restored upon the passing of the trailing edge 76. The time that the beam 86 is first interrupted and the duration for which it is interrupted provides an indication of both tip deflection and twist in the fan blade. It should be appreciated that other sensing devices for detecting responses of the rotating blades are also within the contemplation of this disclosure.

The example system 62 may further utilize strain gauges 78 mounted to the surface of each fan blade 42. Strain gauges 78 are utilized to capture information indicative of deflections in the fan blade 42 that are indicative of twist and tip deflection.

It should be understood that the example system 62 is contemplated for use in a controlled testing environment for engine verification operations. The system 62 maybe an added system that utilizes existing inspection openings. In one disclosed embodiment, the actuators 64 are mounted within exiting mounting ports 106. Existing mounting ports 106 are provided for use with the sensor system 80. The use of existing mounting ports 106 for the actuators 64 instead of the sensors reduces the number of sensors available for measurement of the fan blades 42.

Figure 4:
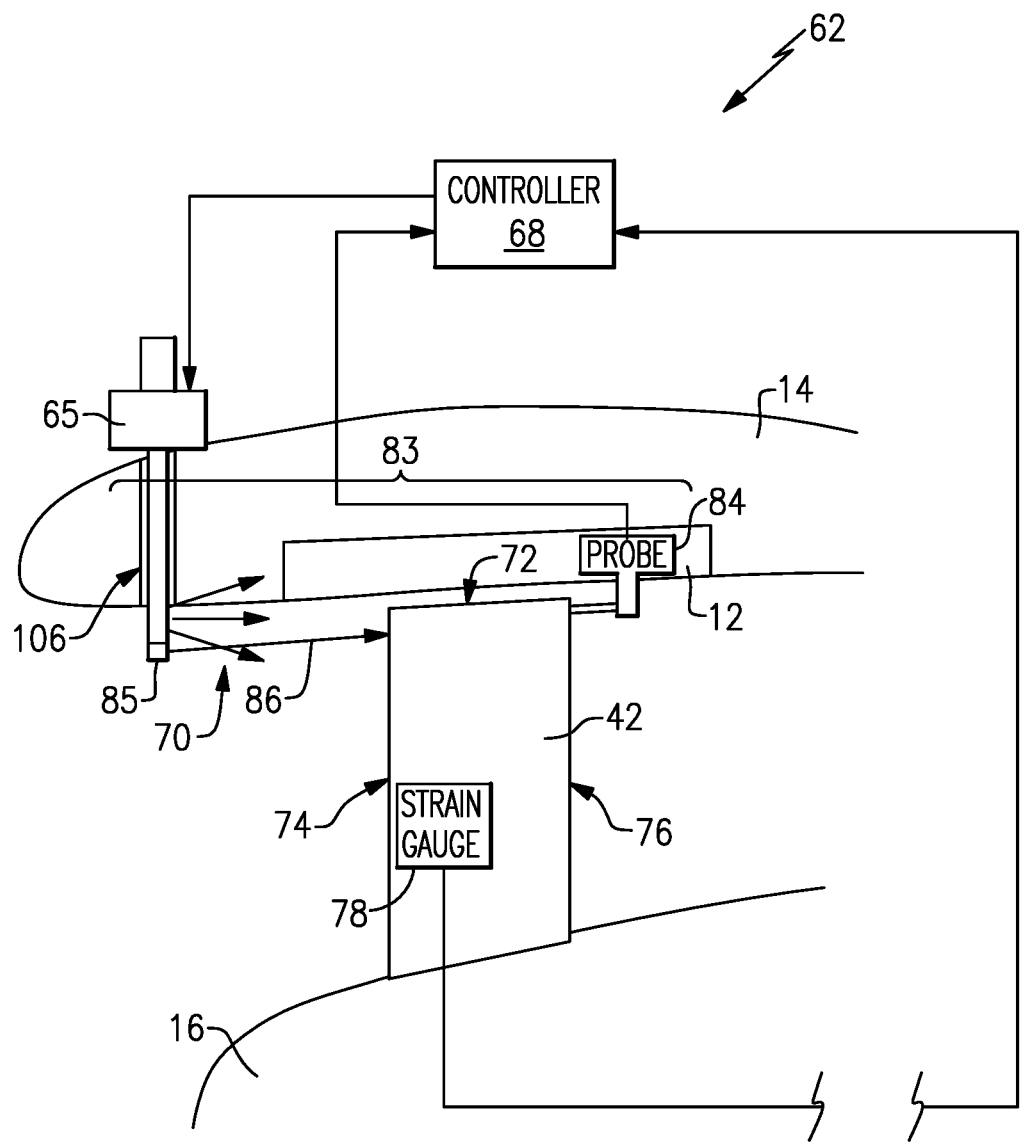
FIG. 4 is a schematic view of another example aeromechanical identification system embodiment.

Referring to FIG. 4, another sensor system embodiment 83 includes an actuator 65 that includes a probe 85. The probe 85 operates to receive information on the interruption of the sensor beam 86 in concert with the second probe 84. Accordingly, the desired measurement capability is maintained while also providing the aeromechanical damping measurement capability provided by the actuator 65. Moreover, the number of ports 106 within the fan case 12 and nacelle 14 can be maintained.

Figure 5:
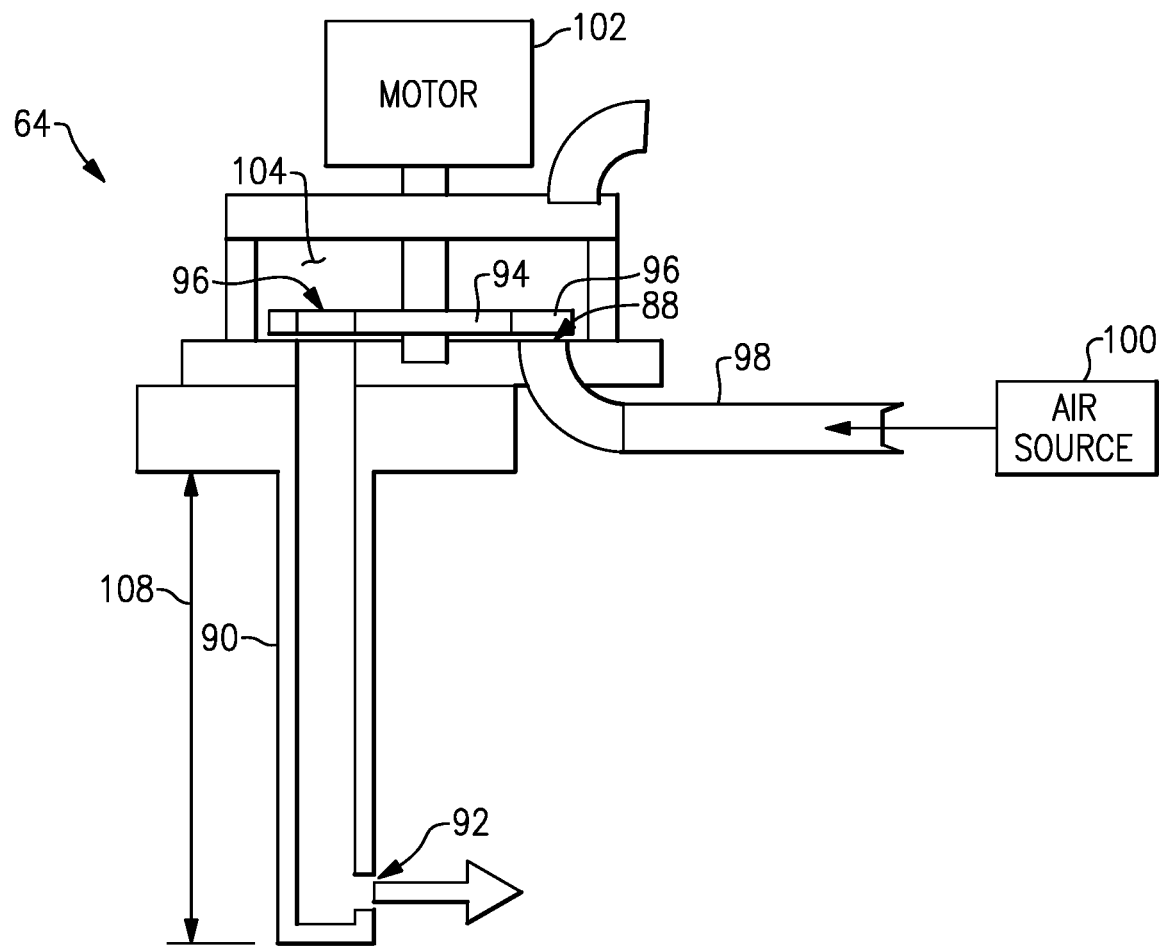
FIG. 5 is a schematic view of an example actuator embodiment.
Figure 6:
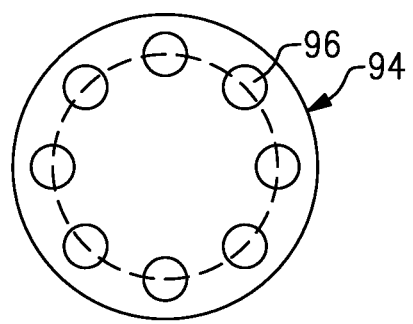
FIG. 6 is a schematic view of a portion of the example actuator.

Referring to FIGS. 5 and 6, with reference to FIG. 3, the example actuator 64 provides a high frequency actuation capability. The actuators 64 are enabled with a capability of exciting the fan blades across a varying range of frequencies. The range of frequencies enabled can include relatively high frequencies. Accordingly, the example actuator 64 is configured to provide oscillatory excitation over a range of specific frequencies with a phase relationship among all the actuators 64. The example actuator 64 is configured as a spinning valve and includes a plate 94 with at least one opening 96. In the disclosed example the plate 94 includes a plurality of openings 96. The plate 94 is driven by a motor 102 at a desired speed that provides the desired frequency of injected fluid jet. The plate 94 is in communication with a high pressure air source 100 through an inlet conduit 98 and an outlet tube 90. The outlet tube 90 extends through the fan case 12 or other static structure to position the outlet 92 in a desired orientation proximate the fan blades 42.

The plate 94 is disposed within a chamber 104 that receives high pressure air flow from the source when an opening 96 passes over an inlet 88. Air is communicated to the outlet tube 90 when an opening 96 passes an outlet 96. In this example the openings 96 are equally spaced such that an open time and a closed time are equal when the plate 94 is rotated at a constant speed. Accordingly, rotation of the plate 94 at a constant speed provides a defined frequency of air or gas injection through the outlet 92. Control of the rotational speed of the plate 94 therefore provides the desired frequency of air injection against the fan blades 42.

The outlet tube 90 includes a constant diameter along a length 108. The length 108 of the tube 90 is minimized such that a distance between the outlet 96 and the injector outlet 92 is minimized to maintain the desired frequency response and reduce any potential lag time. While the example tube 90 is shown as a straight tube, the tube 90 may be curved or otherwise shaped to adapt to specific engine orientations. However, regardless of the shape of the tube 90, the diameter is maintained constant to provide the desired rapid response and to reduce losses or flow inconsistencies.

Moreover, the length 108 of the outlet tube 90 could be varied to provide a varying frequency response to enable a single high frequency actuator 64 to be used to excite a wide range of frequencies.

The disclosed system 62 enables measurements of aeromechanical damping to determine flutter margins and boundaries. Moreover, the example system provides a quantifiable information on aeromechanical damping of aeromechanical modes of fan blades, and other rotating airfoils such that it provides a useful diagnostic tool for optimizing engine life cycle costs.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. An aeromechanical identification system for turbomachine comprising:
    at least one injector mounted on a stationary structure to excite rotating airfoils, wherein the stationary structure includes a passage and the at least one injector is mounted at an outlet of the passage proximate the rotating airfoils and directs a jet stream at the rotating airfoils at a defined frequency, the at least one injector comprises a rotating plate disposed within a chamber in communication with an inlet and an outlet through at least two openings within the rotating plate, wherein airflow from the inlet is communicated into the chamber when one of the at least two openings in the rotating plate aligns with the inlet and is exhausted from the chamber when another of the at least two openings in the rotating plate aligns with the outlet, wherein the rotating plate is rotated by a motor at a constant speed to communicate the at least two openings with the inlet and the outlet at periodic intervals determined to generate the defined frequency of the jet stream to excite the rotating airfoils;
    at least one sensor mounted proximate the airfoils for measuring a response of the airfoils responsive to excitation from the at least one injector; and
    a controller configured to determine an aeromechanical damping characteristic of an aeromechanical mode of the rotating airfoils in a stable turbomachine operating range based on the measured response of the rotating airfoils in response to the excitation of the rotating airfoils induced by the at least one injector.

2. The aeromechanical identification system as recited in claim 1, wherein the at least one injector comprises a plurality of injectors spaced circumferentially apart around the stationary structure of the turbomachine.

3. The aeromechanical identification system as recited in claim 1, wherein the at least one injector comprises a modulating control valve that modulates the jet stream to excite the rotating airfoils.

4. The aeromechanical identification system as recited in claim 1, wherein the jet stream is one of a directed gas jet, a directed fluid jet or a directed jet of a combination of gas and fluid.

5. The aeromechanical identification system as recited in claim 1, wherein an injector outlet is disposed at an end portion of an outlet tube that extends into an airstream proximate the rotating airfoils.

6. The aeromechanical identification system as recited in claim 1, wherein the at least one injector directs the jet stream toward a leading edge portion of a tip of each of the rotating airfoils.

7. The aeromechanical identification system as recited in claim 1, wherein the at least one injector directs the jet stream against a tip of each of the rotating airfoils from a position radially outward of the rotating airfoils.

8. The aeromechanical identification system as recited in claim 1, wherein the sensor comprises a non-contact measurement device supported radially outward of a tip of the rotating airfoils.

9. The aeromechanical identification system as recited in claim 1, wherein the sensor comprises a beam interrupt measurement system including a first probe disposed upstream of the rotating airfoils and a second probe downstream of the rotating airfoils, the beam interrupt measurement system configured to determine airfoil characteristics responsive to interruption of a beam projected between the first probe and the second probe.

10. The aeromechanical identification system as recited in claim 8, wherein the sensor and at least one injector are mounted at a common location proximate the rotating airfoils.

11. The aeromechanical identification system as recited in claim 1, including a strain gauge attached to at least one of the rotating airfoils that is configured to communicate information indicative of strain on the at least one of the rotating airfoils responsive to the jet stream to the controller.

12. A gas turbine engine comprising:
    a rotating row of airfoils circumscribed by a fixed case;
    at least one injector mounted within the case and configured for directing an energy stream over a range of frequencies to excite the row of rotating airfoils, the at least one injector comprises a rotating plate disposed within a chamber in communication with an inlet and an outlet through at least two openings within the rotating plate, wherein airflow from the inlet is communicated into the chamber when one of the at least two openings in the rotating plate aligns with the inlet and is exhausted from the chamber when another of the at least two openings in the rotating plate aligns with the outlet, wherein the rotating plate is rotated by a motor at a constant speed to communicate the at least two openings with the inlet and the outlet at periodic intervals determined to generate the defined frequency of the energy stream to excite the rotating airfoils;
    at least one sensor mounted within the case configured for measuring a structural response of the rotating row of airfoils to the directed energy stream; and
    a controller configured to determine an aeromechanical damping characteristic of an aeromechanical mode of the rotating row of airfoils in a stable turbomachine operating range based on the measured structural response of the rotating airfoils to the directed energy stream from the at least one injector.

13. The gas turbine engine as recited in claim 12, wherein the at least one injector comprises a plurality of injectors spaced circumferentially apart within the fixed case.

14. The gas turbine engine as recited in claim 13, wherein the at least one sensor comprises a non-contact measurement device supported radially outward of a tip of the row of rotating airfoils.

15. The gas turbine engine as recited in claim 13, wherein the at least one sensor comprises a beam interrupt measurement system including a first probe disposed upstream of the rotating airfoils and a second probe downstream of the rotating airfoils, the beam interrupt measurement system configured to determine airfoil characteristics responsive to interruption of a beam projected between the first probe and the second probe.

16. The gas turbine engine as recited in claim 12, including a strain gauge attached to at least one of the row of rotating airfoils, the strain gauge configured to communicate information indicative of stresses on the rotating airfoils responsive to the energy stream to the controller.

* * * * *